R. H. DORN.
Improvement in Circular Cutters.

No. 115,587. Patented June 6, 1871.

Witnesses:
E. Wolff
Wm. H. C. Smith

Inventor:
R. H. Dorn.
per Munn & Co.
Attorneys.

UNITED STATES PATENT OFFICE.

RUFUS H. DORN, OF PORT HENRY, NEW YORK.

IMPROVEMENT IN CIRCULAR CUTTERS.

Specification forming part of Letters Patent No. 115,587, dated June 6, 1871.

*To all whom it may concern:*

Be it known that I, RUFUS H. DORN, of Port Henry, in the county of Essex and State of New York, have invented a new and Improved Circular Cutter for Wood-work; and I do hereby declare the following to be a full, clear, and exact description thereof, which will enable others skilled in the art to make and use the same, reference being had to the accompanying drawing forming a part of this specification, in which drawing—

Figure 1:
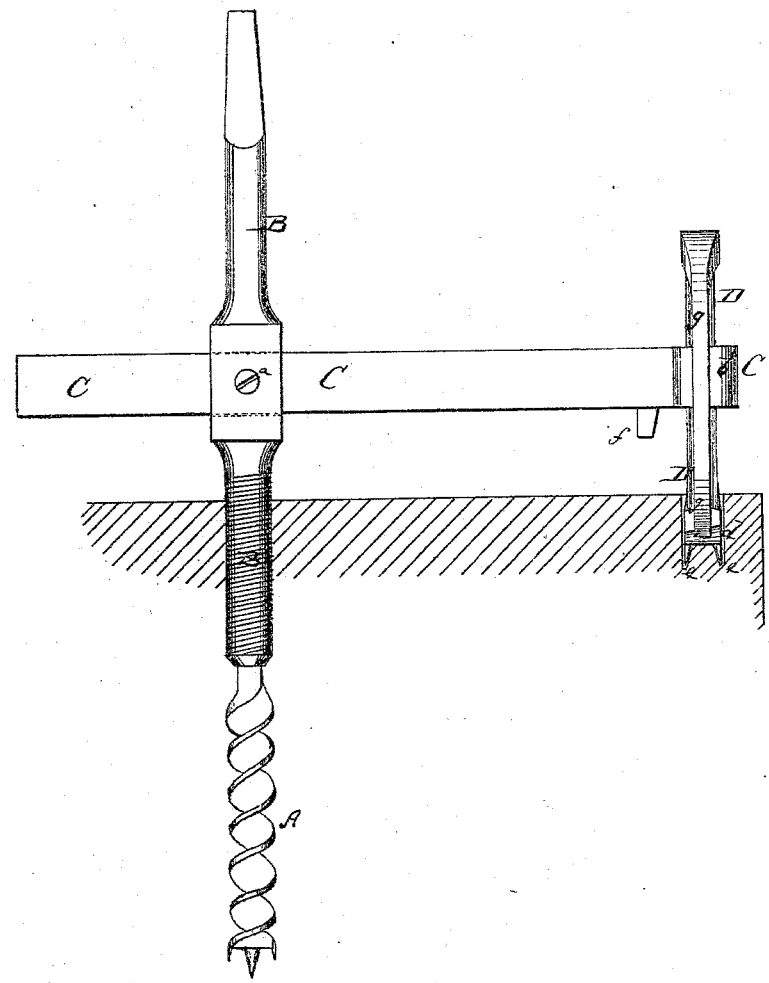
Figure 2:
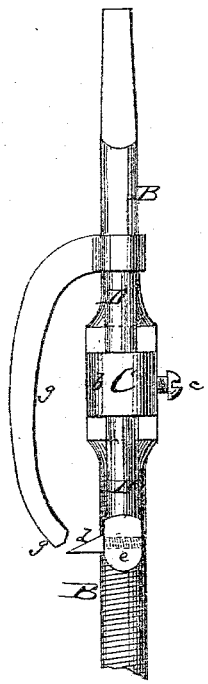

Figure 1 is a side view of my improved circular cutter. Fig. 2 is an end view of the same.

Similar letters of reference indicate corresponding parts.

This invention relates to a new implement for cutting circular holes of suitable diameter, from the fraction of an inch to several feet, cutting annular or curved sections of wood, making disks of suitable diameter, and similar circular work. The invention consists in the combination, with an ordinary auger or bit, of a vertically-adjustable cutter on a horizontally-adjustable arm of the bit-shank.

A in the drawing represents a drill, auger, or bit of the kind used for drilling holes through wood. B is the bit-shank. Its lower part is of cylindrical form, not larger in diameter than the bit, and has, by preference, a screw-thread cut upon it, so that it will readily and gradually follow in the hole cut by the bit. The shank may be affixed to a suitable brace or other device for receiving its motion. C is a bar fitted at right angles through an aperture in the shank B, so that it can slide therein and be locked in suitable position by means of a thumb-screw, $a$. One end of the bar C has an eye, $b$, through which is fitted a rod, D, parallel to the shank B. This rod is vertically adjustable in the eye $b$, and can be locked at suitable height by a thumb-screw, $c$. The lower end of the rod D carries a horizontal cutter, $d$, of suitable kind. It is represented as a wedge-shaped knife, flanked by two incisors, $e\ e$, but may be of other suitable form or kind. From the upper part of the rod E projects a curved guard, $g$, toward and near to the cutter $d$, to prevent the same from entering too deep in the wood. A stop or gage, $f$, for regulating the depth to be reached by the cutter $d$, may be affixed to the bar C.

The operation of the implement is as follows: The bit is applied to the center of the article to be cut, and the rod D adjusted as far from it as it is desired to cut, and set at the desired height. The bit is then revolved, causing the knife $d$ to cut in a circular track to the proper depth.

This tool will be of great use to wheelwrights, joiners, and wood-workers in general.

By properly shaping the cutting-edge of the knife circular moldings, beads, &c., can be cut by this tool.

Having thus described my invention, I claim as new and desire to secure by Letters Patent—

The protective guard $g$, applied to the rod D, in combination with the knife $d$, substantially as herein shown and described.

RUFUS H. DORN.

Witnesses:
CHAS. W. PLATT,
ROLLIN B. HOLDREDGE.